United States Patent [19]
Scott et al.

[11] 3,901,526
[45] Aug. 26, 1975

[54] SLED WITH STEERABLE RUDDER

[76] Inventors: Ian G. Scott, 72-17 34th Ave., Jackson Heights, N.Y. 11372; Rose Oberstein, 55 Knolls Crescent, Bronx, N.Y. 10463

[22] Filed: Apr. 5, 1973

[21] Appl. No.: 348,059

Related U.S. Application Data

[63] Continuation-in-part of Ser. No. 232,442, March 7, 1972, abandoned.

[52] U.S. Cl.................................... 280/21 R
[51] Int. Cl.................................... B62b 13/08
[58] Field of Search............ 280/15, 16, 12 R, 12 B, 280/23, 21 R, 22

[56] References Cited
UNITED STATES PATENTS

| | | | |
|---|---|---|---|
| 2,910,708 | 11/1959 | Albright | 280/21 R |
| 3,123,374 | 3/1964 | MacLeod | 280/12 B |
| 3,352,567 | 11/1967 | Swanson | 280/12 B |
| 3,677,568 | 7/1972 | Nelson | 280/21 R |

Primary Examiner—Robert R. Song
Attorney, Agent, or Firm—Clarence A. O'Brien; Harvey B. Jacobson

[57] ABSTRACT

A sled in the form of a hollow body generally in the shape of a shallow saucer having a convexly curved lower surface for engaging and sliding on a snow-covered surface and a manually pivotal control means oriented at the rear of the body operatively associated with a flexible member that extends forwardly alongside the body of the sled and the occupant therein to enable the occupant to control the path of movement of the sled. The control means is in the form of a rudder either single or multiple. One embodiment has two spaced longitudinally extending ribs along the bottom surface thereof and an upwardly extending mounting post which is pivotally and vertically movable in a supporting structure at the rear of the body and another embodiment has a single vertical plate or multiple vertical plates of plastic material having a plastic hinge incorporated therein and of one-piece construction therewith.

5 Claims, 7 Drawing Figures

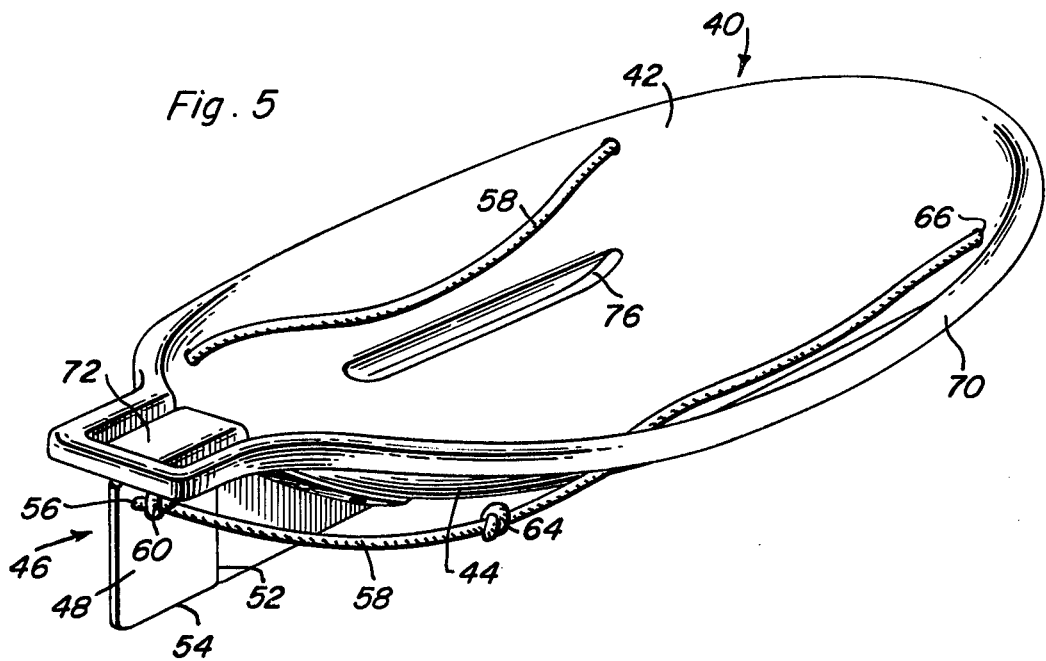
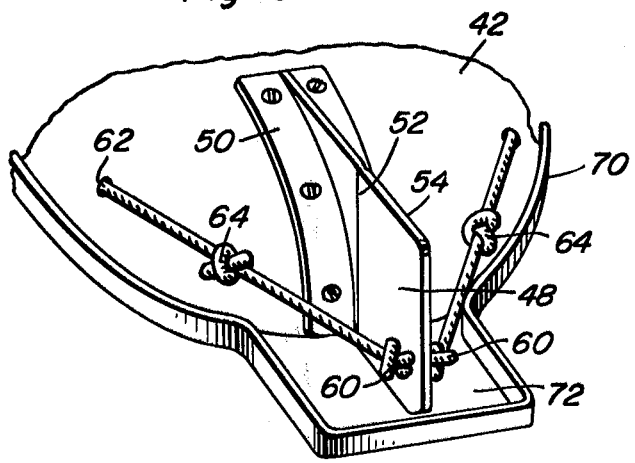
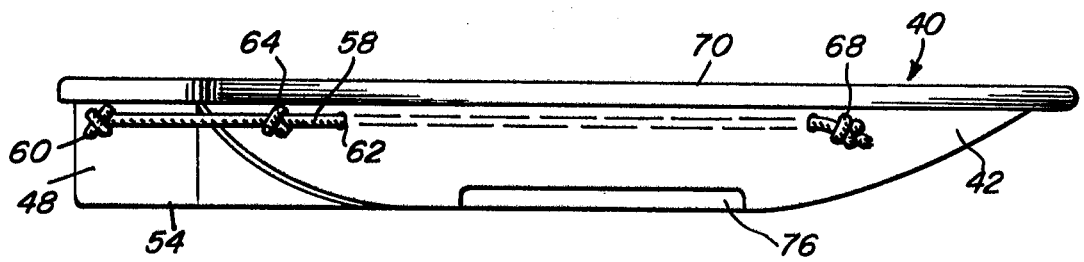

SLED WITH STEERABLE RUDDER

CROSS REFERENCE TO RELATED APPLICATION

This application is a continuation-in-part of copending application Ser. No. 232,442, filed Mar. 7, 1972, now abandoned.

BACKGROUND OF THE INVENTION

1. Field of the Invention

The present invention generally relates to sleds and more particularly, sleds having a pan-like or saucer-like configuration for sliding along a snow-covered surface or the like and more particularly to such a sled having a steering control assembly mounted at the rear thereof to enable the occupant of such a sled to control his path of movement.

2. Description of the Prior Art

Conventional sleds constructed with two metal runners are steerably controlled by flexing the upwardly curved forward end portions of the runners laterally of the path of movement so that the path of movement of such a sled can be controlled. Also available is a sled constructed of sheet metal or plastic of saucer-like configuration which provides a symmetrical convex bottom surface defining a segment of a sphere. While such devices can be relatively inexpensively manufactured and will slide effectively along a snow-covered surface, one of the major objections to this type of sled is the lack of stability and control. For example, when a child is descending down a slope or hill which is snow covered, he quite frequently will spin and turn uncontrollably as he descends which in some instances creates a hazardous condition since he may come into contact with stationary objects or move into the path of other sleds and create or face many other hazards due to his uncontrolled movement.

SUMMARY OF THE INVENTION

An object of the present invention is to provide a sled generally of saucer-like configuration but oval-shaped in plan so that the sled has a major longitudinal axis that has a convexly curved surface which may be symmetrical from side to side but which is unsymmetrical from end to end with the rear portion of the curved surface having a sharper upward curvature than the forward portion thereof to facilitate movement of the sled over a snow-covered surface together with a steerable control member oriented at the rear of the sled for controlling the path of movement and stabilizing its movement characteristics when descending a slope or hill.

Another object of the invention is to provide a sled in accordance with the preceding object in which the control member is in the form of a longitudinally extending laterally pivotal rudder having a longitudinally disposed bottom edge thereon for engaging a snow-covered surface and providing steering control for the sled.

Still another object of the invention is to provide a sled in accordance with the preceding objects in which the rudder is in the form of a single vertical plastic plate or multiple plates, each having a vertical plastic hinge and curved mounting flange incorporated therein so that the rudder is of one-piece construction.

A further object of this invention is to provide a sled in accordance with the first object in which a rear mounted rudder is provided with transversely spaced downwardly facing edges or ribs and a vertically disposed post that is rotatably and vertically slidably mounted on the rear of the body with the post having a transverse member at the upper end thereof to which a flexible line assembly is attached and which extends forwardly of the sled to enable an occupant to steerably control the position of the rudder to thereby control movement of the sled as it descends a slope or hill.

Another important object of the present invention is to provide a sled in accordance with the preceding objects in which a flexible line for steering the sled is operatively connected to the control member and is received in guide passageways or apertures along each side of the sled with free portions of the line disposed at opposite sides of the sled enabling a person to grasp the free portions of the line for steering the sled.

Still another object of the invention is to provide a sled which is relatively inexpensive to manufacture, durable and long-lasting, easy and safe in use and effectively controllable as to its path of movement.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

FIG. 5 is a perspective view of another embodiment of the sled.

FIG. 6 is an inverted, fragmental rear perspective view of the rudder assembly.

FIG. 7 is a side elevational view thereof.

DESCRIPTION OF THE PREFERRED EMBODIMENTS

Figure 1:
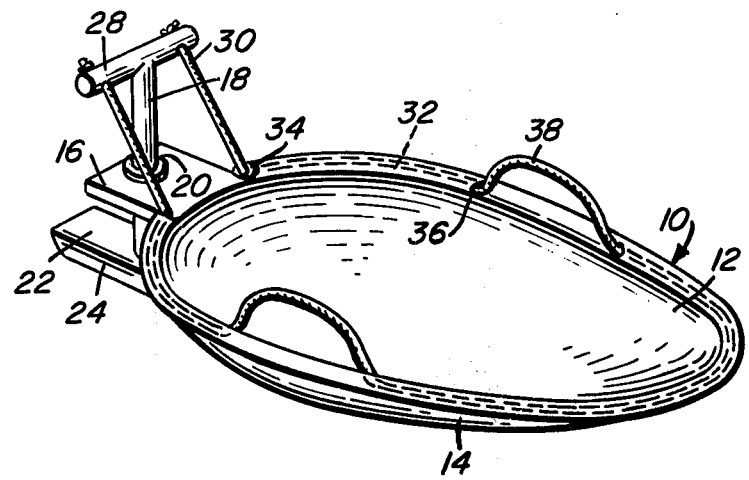
FIG. 1 is a perspective view of one embodiment of the sled of this invention.
Figure 2:
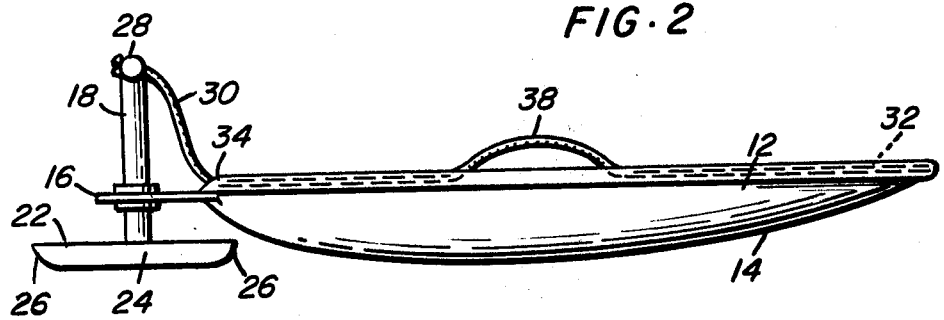
FIG. 2 is a side elevational view thereof.
Figure 3:
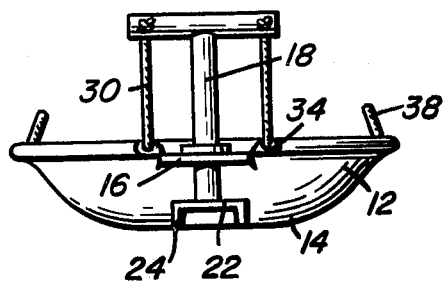
FIG. 3 is a rear elevational view thereof.
Figure 4:
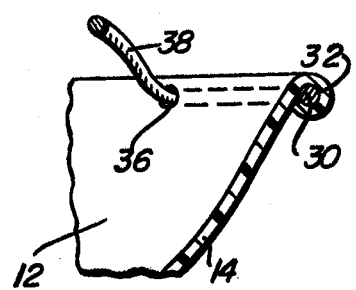
FIG. 4 is a detailed sectional view of a portion of a peripheral edge of the sled illustrating the guide passageway for the flexible control line.

Referring now specifically to FIGS. 1–4 of the drawings, the sled of the present invention is generally designated by reference numeral 10 and includes a generally saucer-like or pan-like body 12 which may be oval-shaped in configuration or of any other suitable configuration with preferably the forward end portion of the body being slightly narrower than the rear end portion and also being slightly shallower as illustrated in FIG. 2. The bottom surface of the body 12 is convexly curved as at reference numeral 14 with the forward portion of the curve 14 sloping gradually upwardly to facilitate sliding movement of the body over a snow-covered surface. The rear edge of the body 12 includes a rearward projection 16 disposed generally at the level of the upper edge of the body 12.

A vertical rod-like member 18 extends through the plate-like extension 16 and is rotatably and vertically movably mounted in an aperture 20 which extends through the extension 16 with the plate-like extension 16 being reinforced in the area where the aperture 20 is formed. The lower end of the vertical member 18 is provided with a longitudinally elongated runner or rudder 22 which is generally in the form of an inverted channel-shaped member having a pair of depending ribs 24 which are spaced transversely from each other and have the leading and trailing ends thereof upwardly curved as at 26. Thus, the two ribs 24 will engage the snow surface and provide steering control for the sled 10. The upper end of the vertical member 18 is provided with a transversely extending member 28 which can be integral therewith or connected thereto in any suitable manner for assembly. Also, the steering control rudder 22 may be integral with or detachably connected to the vertical member 18 to facilitate assembly of the unit and also to facilitate packaging and shipment thereof.

To enable the occupant of the body 12 to control the pivotal position of the rudder 22, an elongated flexible line or rope 30 has the ends thereof connected to the opposite ends of the transverse member 28 on the vertical member 18. The line 30 extends through a tubular sleeve-like passageway 32 formed in the peripheral edge of the body 12 with the line 30 entering the passageway 32 at 34 which is adjacent the juncture of the plate-like extension 16 and the rear edge of the body 12. Adjacent each side of the body 12, the flexible line 30 extends through openings 36 which are spaced longitudinally and open to the interior of the body 12 so that a loop portion 38 of the flexible line 30 will be disposed freely toward the interior and top portion of the body 12 as illustrated in FIG. 1. Thus, an occupant of the body 12 may grasp the loops 38 at the opposite sides of the body 12 and by moving the loops 38 and the corresponding portions of the line 30 in opposite directions, the pivotal position of the rudder 22 may be varies thus enabling the rear end portion of the sled to be steerably controlled, thus controlling the path of movement of the sled as it descends a hill or slope.

The sled may be constructed of various materials such as plastics, sheet metal or the like with the passageway 32 being formed as a rolled edge on the peripheral edge of the body 12 and the steering mechanism may also be made of plastic, metal or the like with the flexible line 30 also being in the form of a rope of any suitable material such as woven or braided plastic. The loops 38 also serve as handles to facilitate the occupant retaining his position in the hollow interior of the body 12 and, if desired, the line may not extend across the front of the sled in the guide but could terminate in handles of the loop type or any other type at each side of the sled or in some instances be adapted to receive the feet of the occupant to enable the sled to be steerably controlled by the occupant moving his feet. Also, the occupant, by shifting his weight forwardly can cause the rear of the body to tilt upwardly thus enabling him to eliminate the steering control thus resulting in a "free fall" ride whereas leaning rearwardly in the body will increase the effectiveness of the steering control although the steering control is capable of vertical movement so that as the sled moves over uneven terrain, the rudder will not dig into the snow surface or cause tilting of the sled.

Referring now specifically to the embodiment illustrated in FIGS. 5–8 of the drawings, the sled of the present invention is generally designated by reference numeral 40 and includes a generally saucer-like or pan-like body 42 which may be oval-shaped in configuration or of any other suitable configuration with preferably the forward end portion of the body being slightly narrower than the rear end portion and also being slightly shallower as illustrated in FIG. 7. The bottom surface of the body 42 is convexly curved as at reference numeral 44 with the forward portion of the curve 44 sloping gradually upwardly to facilitate sliding movement of the body over a snow-covered surface. The rear edge of the body 42 includes a rearwardly projecting rudder assembly 46 having an upper edge disposed generally at the level of the upper edge of the body 42.

The rudder assembly 46 includes a vertically disposed plate 48 of plastic material with the forward edge of the plate 48 having a transverse flange 50 integral therewith. The flange 50 is arcuately curved to conform with the external surface of the body 42 and is attached thereto by suitable fasteners or any other adequate attaching means. The plate 48 includes a vertical hinge 52 incorporated therein which is formed by providing a groove in the opposite vertical surfaces of the plate thereby forming a "living hinge" in the plastic plate which permits the portion thereof rearwardly of hinge 52 to swing about a vertical axis whereby the bottom edge 54 defines a rudder.

The upper rear corner of plate 48 is provided with an aperture 56 to receive the mid-portion of a flexible line or rope 58. To enable the occupant of the body 42 to control the pivotal position of the plate 48, the elongated flexible line or rope 58 has knots 60 formed therein closely adjacent opposite surfaces of the plate 48, as shown in FIG. 6. The rope 58 extends through apertures 62 in the periphery of body 42 as also seen in FIG. 6. In installing the rope 58, the rope is slid through the aperture 56 and the plate 48 so that the rope measures half on each side and then the knots 60 are tied flush to the rudder on each side. Additional knots 64 are formed in the rope 58 approximately nine inches from each of the knots 56 with the arrangement of the knots 64 being such that they will engage the outer periphery of the body 42 when the rudder plate 48 is pivoted approximately 45°. Thus, the knots 64 will limit the movement of the rudder to approximately 45° in each direction.

The portions of the rope 58 beyond the knots 64 extend through the aperture 62 and alongside of the inner surface of the body 42 and then out through apertures 66 adjacent the forward upwardly curved portion of the body 42 as illustrated in FIG. 7 with knots 68 being formed in the terminal ends thereof so that the portions of the rope 58 interiorly of the body 42 define loops or free portions by which the rope may be grasped by an occupant to enable the rudder to be pivoted in either direction to control and stabilize the path of movement of the sled.

The peripheral edge of the body 42 is provided with a rolled or downturned edge 70 which serves as a rigidifying structure for the body 42 and also provides a handgrip area. The rear end of the body 42 is provided with a projecting ledge 72 which overlies the rudder plate 58 with the rolled edge being continuous around the ledge 72 and joined therewith by virtue of the body 42 being of one-piece construction. For added stability to the sled, the body 42 is provided with a pair of longitudinally extending depending ribs 76 on the upwardly curving side surface thereof to further stabilize the sliding movement of the sled.

While a single rudder has been illustrated in FIGS. 5–7, it is pointed out that two rudders of the same construction can be placed on either side of the rear of the sled rather than the single rudder in the middle at the rear of the sled or, in addition to the single rudder at the rear of the sled. This arrangement would provide a single rudder as illustrated, a dual or triple rudder to provide greater steering control and stability with the rope being provided with knots in appropriate locations to move all of the rudders in the same manner as the single rudder illustrated in the drawings.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A riding toy comprising a body having a smoothly curved convex bottom surface for sliding engagement with a supporting surface, said body having a hollow, open-topped concave upper surface for receiving an occupant, and a control member mounted on said body in trailing aligned relation to the central portion of the bottom surface for engagement with the supporting surface for controlling the path of movement of the toy, said control member including a longitudinally extending rudder, means mounting said rudder from said body for pivotal movement about substantially a vertical axis, and means operatively connected with said rudder and extending forwardly into the body for enabling manual control of the rudder and steering control of the toy when sliding on a supporting surface, said rudder including a vertically disposed plate, said mounting means including a mounting flange attached to said body with the plate extending rearwardly from the flange, said plate including a vertically extending hinge disposed adjacent the flange.

2. The structure as defined in claim 1 wherein said control means including a flexible member anchored to said plate rearwardly of the hinge and including separate control portions extending along opposite top edges of the body to enable an occupant to grasp and manipulate the separate control portions of the flexible member to pivotally swing the rudder.

3. The structure as defined in claim 1 wherein said concave upper surface includes a peripheral upper edge and a seat portion below the upper edge whereby the center of gravity of the body and occupant therein will be disposed below the upper edge of the body, said rudder control means including flexible means connected to the plate and extending forwardly interiorly of the body adjacent the upper edge to enable an occupant to grasp and manipulate the flexible means.

4. A riding toy comprising a body having a smoothly curved convex bottom surface for sliding engagement with a supporting surface, said body having a hollow, open-topped concave upper surface for receiving an occupant, and a control member mounted on said body in trailing aligned relation to the central portion of the bottom surface for engagement with the supporting surface for controlling the path of movement of the toy, said control member including a longitudinally extending rudder, means mounting said rudder from said body for pivotal movement about substantially a vertical axis, and means operatively connected with said rudder and extending forwardly into the body for enabling manual control of the rudder and steering control of the toy when sliding on a supporting surface, said rudder including a vertically disposed plate, said mounting means including a mounting flange attached to said body with the plate extending rearwardly from the flange, said plate including a vertically extending hinge disposed adjacent the flange, said plate, hinge and flange being of one-piece plastic construction with the hinge defined by vertical grooves formed in opposed alignment with each other in the surfaces of the plate.

5. The structure as defined in claim 4 wherein said body includes a continuous bottom surface for sliding engagement with snow to form a sled, the lowermost and central portion of the body surface being substantially longitudinally straight with the lower edge of the plate forming a continuation of the straight central portion of the bottom surface of the body, said mounting flange being arcuate and extending laterally from both sides of the forward edge of the plate for connecting the plate with the body, said control means for the plate including flexible line portions extending longitudinally interiorly of opposite side portions of said body adjacent the open top of the body with the forward ends of the flexible line portions including means limiting rearward movement thereof, the rearward portions of the flexible line portions being connected with said plate whereby an occupant of the sled may arcuately adjust the plate by selectively pulling on the flexible line portions, intermediate portions of the flexible line portions including means limiting their forward movement thereby limiting the swinging movement of the plate about the vertical hinge.

* * * * *